United States Patent
Takahashi et al.

(10) Patent No.: US 9,307,433 B2
(45) Date of Patent: Apr. 5, 2016

(54) MOBILE COMMUNICATION METHOD

(75) Inventors: Hideaki Takahashi, Tokyo (JP); Wuri Andarmawanti Hapsari, Tokyo (JP); Anil Umesh, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/806,162

(22) PCT Filed: Jun. 21, 2011

(86) PCT No.: PCT/JP2011/064174
§ 371 (c)(1),
(2), (4) Date: Mar. 28, 2013

(87) PCT Pub. No.: WO2011/162262
PCT Pub. Date: Dec. 29, 2011

(65) Prior Publication Data
US 2013/0229932 A1  Sep. 5, 2013

(30) Foreign Application Priority Data
Jun. 21, 2010  (JP) ................................ 2010-141111

(51) Int. Cl.
*H04W 24/10* (2009.01)
*H04W 24/00* (2009.01)

(52) U.S. Cl.
CPC .............. *H04W 24/10* (2013.01); *H04W 24/00* (2013.01)

(58) Field of Classification Search
CPC . H04W 24/10; H04W 72/042; H04W 76/028; H04W 24/02; H04W 56/0005
See application file for complete search history.

(56) References Cited

U.S. PATENT DOCUMENTS

| | | |
|---|---|---|
| 2009/0170426 A1 | 7/2009 | Jung et al. |
| 2010/0048209 A1 | 2/2010 | Aoyama et al. |
| 2010/0075667 A1 | 3/2010 | Nakamata et al. |
| 2010/0267378 A1 | 10/2010 | Hamabe et al. |
| 2011/0194441 A1* | 8/2011 | Jung et al. ...................... 370/252 |
| 2011/0201279 A1* | 8/2011 | Suzuki et al. ............... 455/67.11 |
| 2012/0015657 A1* | 1/2012 | Comsa et al. ................. 455/436 |
| 2012/0064886 A1* | 3/2012 | Kim et al. ..................... 455/423 |
| 2012/0315890 A1* | 12/2012 | Suzuki et al. ............... 455/422.1 |

(Continued)

FOREIGN PATENT DOCUMENTS

| | | |
|---|---|---|
| EP | 2 139 287 A1 | 12/2009 |
| JP | 2000-13839 A | 1/2000 |

(Continued)

OTHER PUBLICATIONS

International Search Report issued in PCT/JP2011/064174 mailed Aug. 2, 2011 (4 pages).

(Continued)

*Primary Examiner* — Jung Park
(74) *Attorney, Agent, or Firm* — Osha Liang LLP

(57) ABSTRACT

A mobile communication method according to the present invention includes a step of transmitting, by a mobile management node MME, "Measurement Configuration #1" for instructing to measure and report a desired radio quality to a radio base station eNB#1 that manages a cell #1 when it is detected that a mobile station UE has moved into the cell #1 that lies inside a measurement-target area, and a step of transmitting, by the radio base station eNB#1, "RRC Connection Reconfiguration" including the "Measurement Configuration #1" to the mobile station UE.

4 Claims, 11 Drawing Sheets

(56) References Cited

U.S. PATENT DOCUMENTS

2013/0072182 A1* 3/2013 Jung et al. .................. 455/422.1
2013/0137460 A1* 5/2013 Bodog et al. ............... 455/456.2

FOREIGN PATENT DOCUMENTS

| | | |
|---|---|---|
| JP | 2008-289071 A | 11/2008 |
| JP | 2010-74738 A | 4/2010 |
| JP | 2010-114779 A | 5/2010 |
| WO | 2009/060935 A1 | 5/2009 |
| WO | 2009/107953 A2 | 9/2009 |
| WO | 2010/011973 A1 | 1/2010 |
| WO | 2011/099726 A2 | 8/2011 |

OTHER PUBLICATIONS

Japanese Office Action in corresponding Japanese Application No. 2010-141111 mailed Aug. 3, 2011 (6 pages).

3GPP TR 36.805 V9.0.0; "3rd Generation Partnership Project; Technical Specification Group Radio Access Network; Study on Minimization of drive-tests in Next Generation Networks; (Release 9)"; Dec. 2009 (24 pages).

3GPP TS 37.320 V10.0.0; "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Dec. 2010 (17 pages).

3GPP TS 32.422 V10.2.1; "3rd Generation Partnership Project; Technical Specification Group Services and System Aspects; Telecommunication management; Subscriber and equipment trace; Trace control and configuration management (Release 10)"; Jan. 2011 (106 pages).

Australian Office Action issued in Australian Patent Application No. 2011270259, mailing date Nov. 13, 2013 (3 pages).

Japanese Office Action issued in Japanese Patent Application No. 2011-105615, mailing date Nov. 26, 2013, with English translation thereof (4 pages).

Chinese Office Action issued in Chinese Patent Application No. 201180030645.4, mailing date Oct. 8, 2013, with English translation thereof (16 pages).

3GPP TS 32.422, V10.0.0; "3rd Generation Partnership Project; Technical Specification Group Services and System Aspects; Telecommunication Management; Subscriber and Equipment Trace; Trace Control and Configuration Management (Release 10);" Jun. 2010 (82 pages).

3GPP TR 36.805, V9.0.0; "3rd Generation Partnership Project; Technical Specification Group Radio Access Network; Study on Minimization of Drive-Tests in Next Generation Networks (Release 9);" Dec. 2009 (24 pages).

Office Action in corresponding Canadian Patent Application No. 2,803,475 dated Jan. 23, 2014 (3 pages).

Office Action issued in counterpart Russian application No. 2012157390/07(090429) mailed Mar. 31, 2014 (12 pages).

Extended European Search Report issued in counterpart European patent application No. 11798146.4 mailed Apr. 3, 2014 (7 pages).

Office Action issued in counterpart Chinese application No. 201180030645.4 mailed Apr. 3, 2014 (20 pages).

Huawei; "Drive Test Architecture"; 3GPP TSG-SA5 (Telecom Management), S5-093160r1; Meeting SA5#66; Dublin, Ireland; Jun. 29-Jul. 2009 (3 pages).

Office Action issued in counterpart Australian application No. 2011270259 mailed Apr. 7, 2014 (4 pages).

Ericsson; "RRC protocol states", 3GPP TSG-RAN Group 2 (Radio layer 2 and Radio layer 3), TSGR2#6(99)807; Sophia Antipolis; Aug. 16-20, 1999 (20 pages).

Office Action issued in corresponding Canadian Patent Application No. 2,803,475, mailed Aug. 22, 2014 (4 pages).

Notification of Appeal Decision issued in corresponding Chinese Application No. 201180030645.4, mailed on Dec. 4, 2014 (14 pages).

EPO Communication (Office Action) in counterpart European Patent Application No. 11 798 146.4 dated Feb. 27, 2015 (6 pages).

3GPP TS 23.401 V9.5.0; "3rd Generation Partnership Project; Technical Specification Group Services and System Aspects; General Packet Radio Service (GPRS) enhancements for Evolved Universal Terrestrial Radio Access Network (E-UTRAN) access (Release 9)"; Jun. 2010 (259 pages).

Office Action issued in counterpart Chinese application No. 201180030645.4 mailed Jun. 30, 2015 (12 pages).

Office Action issued in corresponding Canadian Patent Application No. 2,803,475, mailed Oct. 21, 2015 (4 pages).

Office Action issued in counterpart Chinese application No. 201180030645.4 mailed Nov. 4, 2015 (30 pages).

\* cited by examiner

FIG. 7

| IE/Group Name | Presence | Range | IE type and reference | Semantics description | Criticality | Assigned Criticality |
|---|---|---|---|---|---|---|
| E-UTRAN Trace ID | M | | OCTET STRING (8) | The E-UTRAN TraceID IE is composed of the following:Trace Reference defined in [10] (leftmost 6 octets), and Trace Recording Session Reference defined in [10] (last 2 octets) | | |
| Interfaces To Trace | M | | BIT STRING (8) | Each position in the bitmap represents a eNB interface first bit=S1-MME, second bit =X2, third bit =Uu, other bits reserved for future use. Value '1' indicates 'should be traced'. Value '0' indicates 'should not be trace'. | | |
| Trace depth | M | | ENUMERATED( minimum, medium, maximum, i MinimumWithoutVendorSpecificExtension, MediumWithoutVendorSpecificExtension, MaximumWithoutVendorSpecificExtension, ...) | Defined in [10] | | |
| ChoiceMDT measurement area list | | | | WHEN DESIGNATING GEOGRAPHICAL AREA LIST, ALWAYS INCLUDE E-CGI (OR PCI) LIST OR TA LIST ENCOMPASSING GEOGRAPHICAL AREA LIST | | |
| > TA list | | 1 to < maxnoof TATAIs>Is > | | | | |
| >> TAI list Item | | | | | | |
| >>> TAI | | | | | | |
| > E-CGI (or PCI) list | | 1 to < maxnoofE-CGIs (or PCLs)> | | | | |
| >> E-CGI (PCI) list Item | | | | | | |
| >>> E-CGI (PCI) | | | | | | |
| >Geographical Area list | | | | | | |
| >>AREA DESIGNATED BY LATITUDE AND LONGITUDE INFORMATION | | | | STATE IN CONFORMITY TO TS 23.032 | | |
| Trace Collection Entity IP Address | M | | Transport Layer Address 9.2.2.1 | Defined in [10] | | |

FIG. 8

```
HandoverPreparationInformation message
-- ASN1START
HandoverPreparationInformation ::= SEQUENCE {
    criticalExtensions          CHOICE {
        c1                      CHOICE{
            handoverPreparationInformation-r8  HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}

HandoverPreparationInformation-r8-IEs ::= SEQUENCE {
    ue-RadioAccessCapabilityInfo  UE-CapabilityRAT-ContainerList,
    as-Config                     AS-Config           OPTIONAL,   -- Cond HO
    rrm-Config                    RRM-Config          OPTIONAL,
    as-Context                    AS-Context          OPTIONAL,   -- Cond HO
    nonCriticalExtension          HandoverPreparationInformation-v920-IEs  OPTIONAL
}

HandoverPreparationInformation-v920-IEs ::= SEQUENCE {
    ue-ConfigRelease-r9           ENUMERATED {
        rel9, spare7, spare6, spare5, spare4, spare3,
        spare2, spare1, ...}      OPTIONAL,   -- Cond HO2
    nonCriticalExtension          SEQUENCE {}         OPTIONAL
}
-- ASN1STOP
```

FIG. 9

AS-Config information element

```
-- ASN1START

AS-Config ::=         SEQUENCE {
    sourceMeasConfig              MeasConfig,
    sourceRadioResourceConfig     RadioResourceConfigDedicated,
    sourceSecurityAlgorithmConfig SecurityAlgorithmConfig,
    sourceUE-Identity             C-RNTI,
    sourceMasterInformationBlock  MasterInformationBlock,
    sourceSystemInformationBlockType1 SystemInformationBlockType1(WITH COMPONENTS
                                  {..., nonCriticalExtension ABSENT}),
    sourceSystemInformationBlockType2 SystemInformationBlockType2,
    antennaInfoCommon             AntennaInfoCommon,
    sourceDl-CarrierFreq          ARFCN-ValueEUTRA,
    ...,
    [[ sourceSystemInformationBlockType1Ext OCTET STRING (CONTAINING
                                  SystemInformationBlockType1-v890-IEs) OPTIONAL,
       sourceOtherConfig-r9       OtherConfig-r9
    ]]
}

-- ASN1STOP
```

FIG. 10

```
MeasConfig information element
-- ASN1START
MeasConfig ::=                SEQUENCE{
    -- Measurement objects
    measObjectToRemoveList        MeasObjectToRemoveList          OPTIONAL, -- Need ON
    measObjectToAddModList        MeasObjectToAddModList          OPTIONAL, -- Need ON
    -- Reporting configurations
    reportConfigToRemoveList      ReportConfigToRemoveList        OPTIONAL, -- Need ON
    reportConfigToAddModList      ReportConfigToAddModList        OPTIONAL, -- Need ON
    -- Measurement identities
    measIdToRemoveList            MeasIdToRemoveList              OPTIONAL, -- Need ON
    measIdToAddModList            MeasIdToAddModList              OPTIONAL, -- Need ON
    -- Other parameters
    quantityConfig                QuantityConfig                  OPTIONAL, -- Need ON
    measGapConfig                 MeasGapConfig                   OPTIONAL, -- Need ON
    s-Measure                     RSRP-Range                      OPTIONAL, -- Need ON
    preRegistrationInfoHRPD       PreRegistrationInfoHRPD         OPTIONAL, -- Need OP
    speedStatePars                CHOICE {
        release                       NULL,
        setup                         SEQUENCE{
            mobilityStateParameters       MobilityStateParameters,
            timeToTrigger-SF              SpeedStateScaleFactors
        }
    }                             OPTIONAL, -- Need ON
    ...
}

MeasIdToRemoveList ::=            SEQUENCE (SIZE (1..maxMeasId)) OF MeasId
MeasObjectToRemoveList ::=        SEQUENCE (SIZE (1..maxObjectId)) OF MeasObjectId
ReportConfigToRemoveList ::=      SEQUENCE (SIZE (1..maxReportConfigId)) OF ReportConfigId
-- ASN1STOP
```

MOBILE COMMUNICATION METHOD

TECHNICAL FIELD

The present invention relates to a mobile communication method.

BACKGROUND ART

In 3GPP, there has been discussed technique called "MDT (Minimisation of Drive Tests)" in which a specific mobile station UE is caused to measure and report a desired radio quality.

CITATION LIST

Non Patent Literature

[NPL 1] 3GPP TR36.805, "Evolved Universal Terrestrial Radio Access (E-UTRA); Study on minimization of drive-tests in next generation networks"
[NPL 2] 3GPP TS37.320, "Radio measurement collection for MDT"

However, the MDT does not have a definition for a detailed method for causing a specific mobile station UE to measure and report a desired radio quality when the specific mobile station UE moves into a cell that lies inside a specific area.

Therefore, the present invention has been achieved in view of the above-described problems, and an object thereof is to provide a mobile communication method with which it is possible to cause a specific mobile station UE to measure and report a desired radio quality when the specific mobile station UE moves into a cell that lies inside a specific area.

SUMMARY OF THE INVENTION

A first characteristic of the present invention is summarized in that a mobile communication method includes: a step of transmitting, by a mobile management node, first instruction information for instructing to measure and report a desired radio quality to a first radio base station that manages a first cell when it is detected that a mobile station has moved into the first cell that lies inside a measurement-target area, and a step of transmitting, by the first radio base station, the first instruction information to the mobile station.

A second characteristic of the present invention is summarized in that a mobile communication method includes: a step of transmitting, by a mobile management node, first instruction information for instructing to measure and report a desired radio quality to a first radio base station that manages a first cell when it is detected that a mobile station has performed an Attach process in the first cell that lies inside a measurement-target area, and a step of transmitting, by the first radio base station, the first instruction information to the mobile station.

A third characteristic of the present invention is summarized in that a mobile communication method includes: a step of transmitting, by a mobile management node, first instruction information for instructing to measure and report a desired radio quality to a first radio base station that manages a first cell when it is detected that a mobile station has changed to an "RRC_CONNECTED state" in the first cell that lies inside a measurement-target area, and a step of transmitting, by the first radio base station, the first instruction information to the mobile station.

As described above, according to the present invention, it is possible to provide a mobile communication method with which it is possible to cause a specific mobile station UE to measure and report a desired radio quality when the specific mobile station UE moved into a cell that lies inside a specific area.

BRIEF DESCRIPTION OF DRAWINGS

FIG. 7 is a diagram illustrating an example of a format of an information element "Trace Activation" in "TRACE START" used in the mobile communication system according to the second embodiment of the present invention.
FIG. 8 is a diagram illustrating an example of a format of "Handover Preparation Information" used in the mobile communication system according to the second embodiment of the present invention.
FIG. 9 is a diagram illustrating an example of a format of an information element "AS-Config" in the "Handover Preparation Information" used in the mobile communication system according to the second embodiment of the present invention.
FIG. 10 is a diagram illustrating an example of a format of an information element "MeasConfig" in the information element "AS-Config" in the "Handover Preparation Information" used in the mobile communication system according to the second embodiment of the present invention.

DESCRIPTION OF EMBODIMENTS (Mobile Communication System According to First Embodiment of the Present Invention)

With reference to FIG. 1 to FIG. 4, a mobile communication system according to a first embodiment of the present invention will be described.

Figure 1:
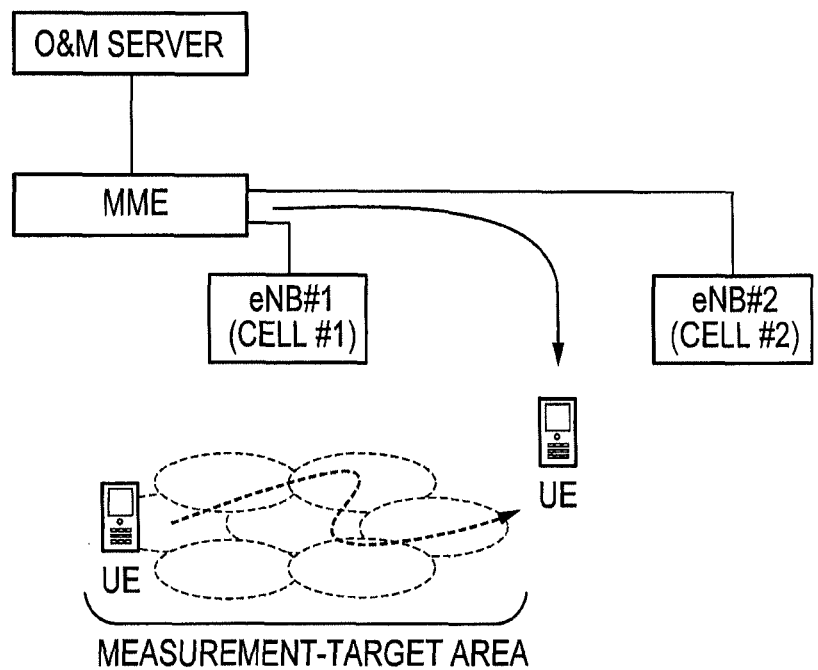
FIG. 1 is a diagram illustrating the entire configuration of a mobile communication system according to a first embodiment of the present invention.

As illustrated in FIG. 1, the mobile communication system according to the present embodiment includes an O&M (Operation & Maintenance) server, a mobile management node MME (Mobility Management Entity), and a radio base station eNB.

The mobile communication system according to the present embodiment is configured to cause a specific mobile station UE to measure and report a desired radio quality when the specific mobile station UE moves into a cell that lies inside a measurement-target area.

As illustrated in FIG. 1, the O&M server is configured to set in advance information for designating a measurement-target area, a desired radio quality to be measured as MDT, a method of reporting a measurement result in the MDT, and the like with respect the mobile management node MME and a radio base station that manages a cell that lies inside the measurement-target area.

For example, the information for designating the measurement-target area includes a cell ID ("E-CGI: Evolved Cell Global Identity") or "PCI: Physical Cell Identity") for identifying a cell included in the measurement-target area, "TAI (Tracking Area ID)" indicating an aggregation of a plurality of cells, and the like.

Figure 2:
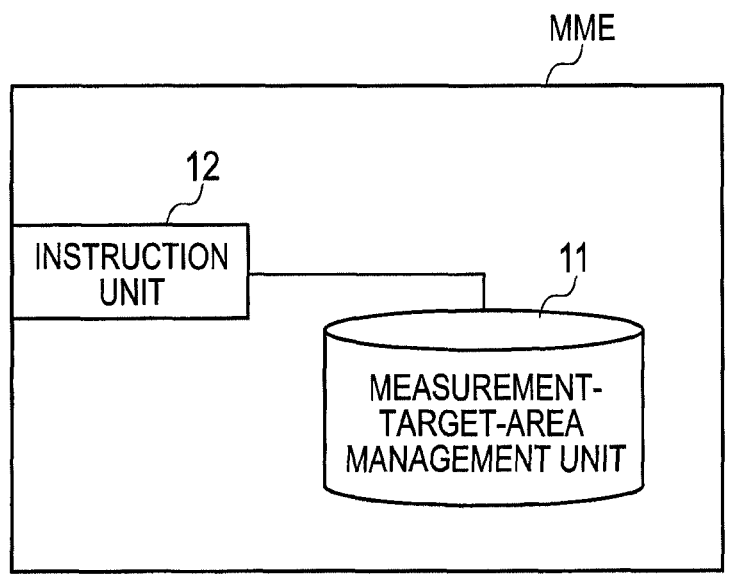
FIG. 2 is a functional block diagram of a mobile management node according to the first embodiment of the present invention.
Figure 3:
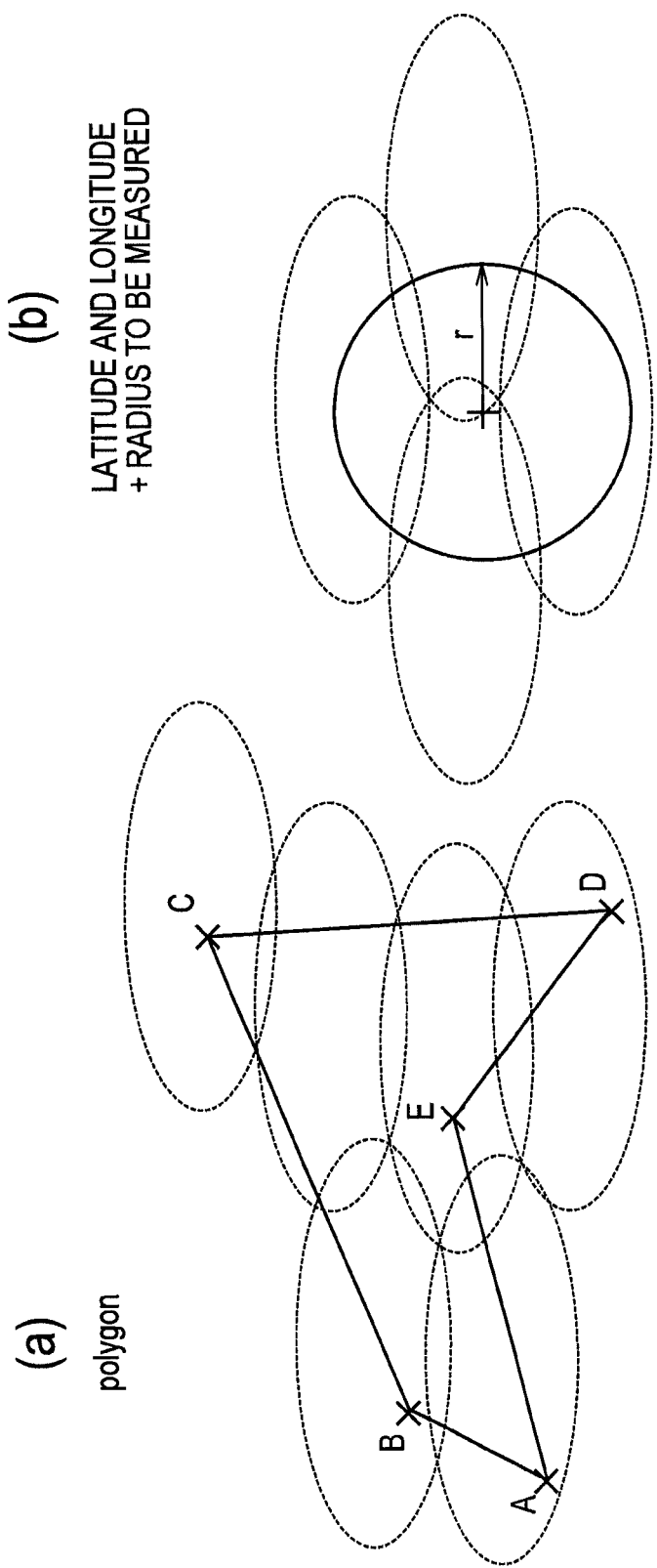
FIG. 3($a$) and FIG. 3($b$) are diagrams for explaining an example of a method for managing a measurement-target area by the mobile management node and a radio base station according to the first embodiment of the present invention.

As illustrated in FIG. 2, the mobile management node MME includes a measurement-target-area management unit 11 and an instruction unit 12.

The measurement-target-area management unit 11 is configured to manage the information for designating the measurement-target area, the desired radio quality to be measured as the MDT, the method of reporting the measurement result in the MDT, and the like, which were acquired from the O&M server.

In addition, when the measurement-target area is designated by latitude/longitude information as illustrated in FIG. 3(a) and FIG. 3(b), the measurement-target-area management unit 11 may be configured to manage a list of cells or TA (Tracking Area), which include the measurement-target area designated by the latitude/longitude information, as the information for designating the measurement-target area.

When it is detected that the mobile station UE has moved into a cell #1 that lies inside the measurement-target area, the instruction unit 12 is configured to transmit "Measurement Configuration #1" for instructing to measure and report a desired radio quality to a radio base station eNB#1 that manages the cell #1.

Specifically, the instruction unit 12 is configured to transmit the "Measurement Configuration #1" by "TRACE START".

Furthermore, when it is detected that the mobile station UE has moved into a cell #2 that lies outside the measurement-target area, the instruction unit 12 is configured to transmit "Measurement Configuration #2" for instructing to stop measuring and reporting the desired radio quality to a radio base station eNB#2 that manages the cell #2.

Specifically, the instruction unit 12 is configured to transmit the "Measurement Configuration #2" by "DEACTIVATE TRACE".

Hereinafter, with reference to FIG. 4, the operation of the mobile communication system according to the present embodiment will be described.

Figure 4:
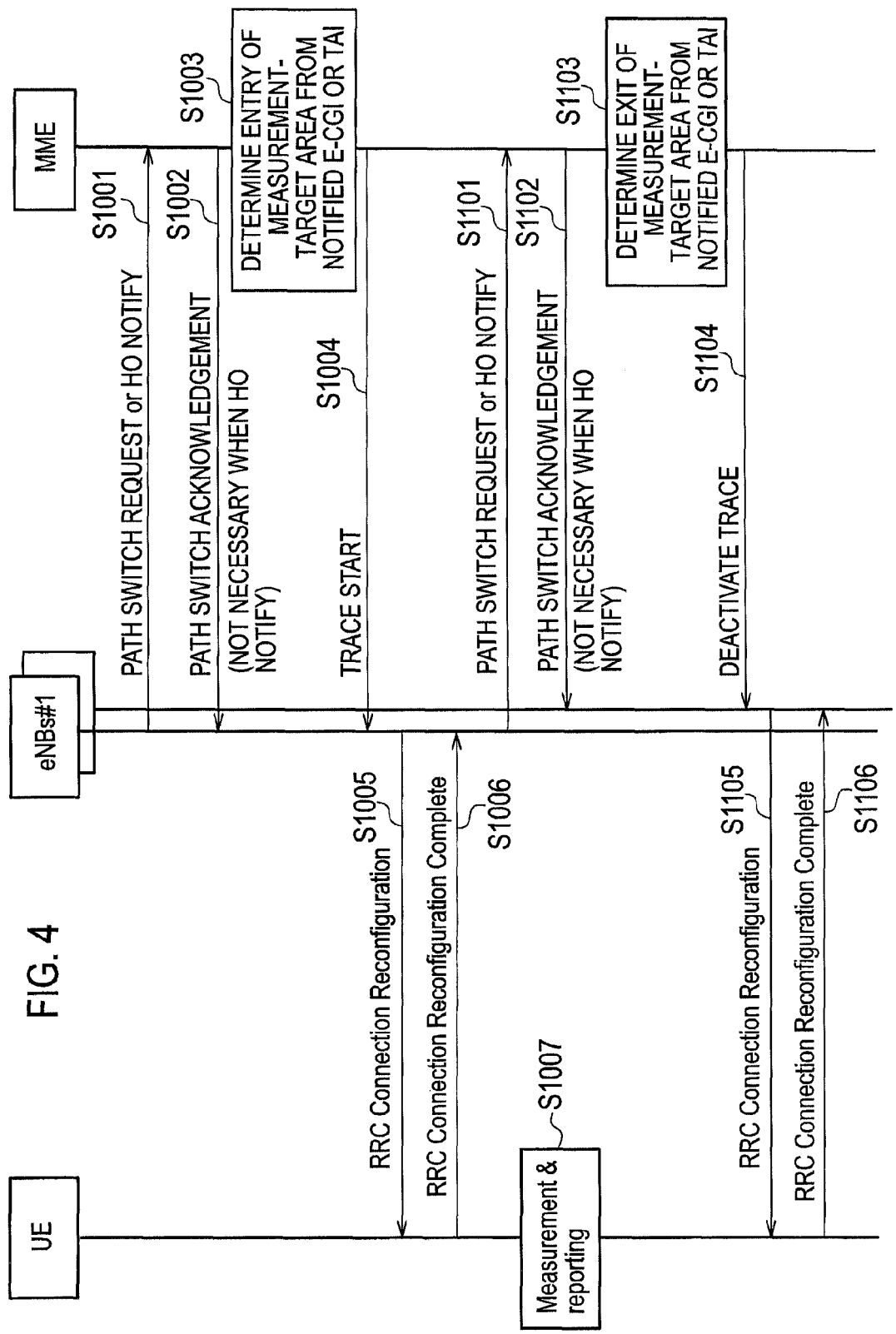
FIG. 4 is a sequence diagram illustrating operations in the mobile communication system according to the first embodiment of the present invention.

As illustrated in FIG. 4, in step S1001, the radio base station eNB#1 transmits "PATH SWITCH REQUEST" or "HO NOTIFY" to the mobile management node MME when performing a handover process of the mobile station UE to the cell #1.

When the "PATH SWITCH REQUEST" is received, the mobile management node MME transmits "PATH SWITCH ACKNOWLEDGEMENT" to the radio base station eNB#1 in step S1002, detects that the mobile station UE moved into the cell #1 that lies inside the measurement-target area on the basis of E-CGI or TAI (Tracking Area Identity) of the cell #1 included in the "PATH SWITCH REQUEST" in step S1003, and transmits the "TRACE START" including the "Measurement Configuration #1" for instructing to measure and report the desired radio quality to the radio base station eNB#1 in step S1004.

Meanwhile, when the "HO NOTIFY" is received, the mobile management node MME detects that the mobile station UE moved into the cell #1 that lies inside the measurement-target area on the basis of the E-CGI or TAI of the cell #1 included in the "PATH SWITCH REQUEST" in the step S1003, and transmits the "TRACE START" including the "Measurement Configuration #1" for instructing to measure and report the desired radio quality to the radio base station eNB#1 in the step S1004.

Figure 12:
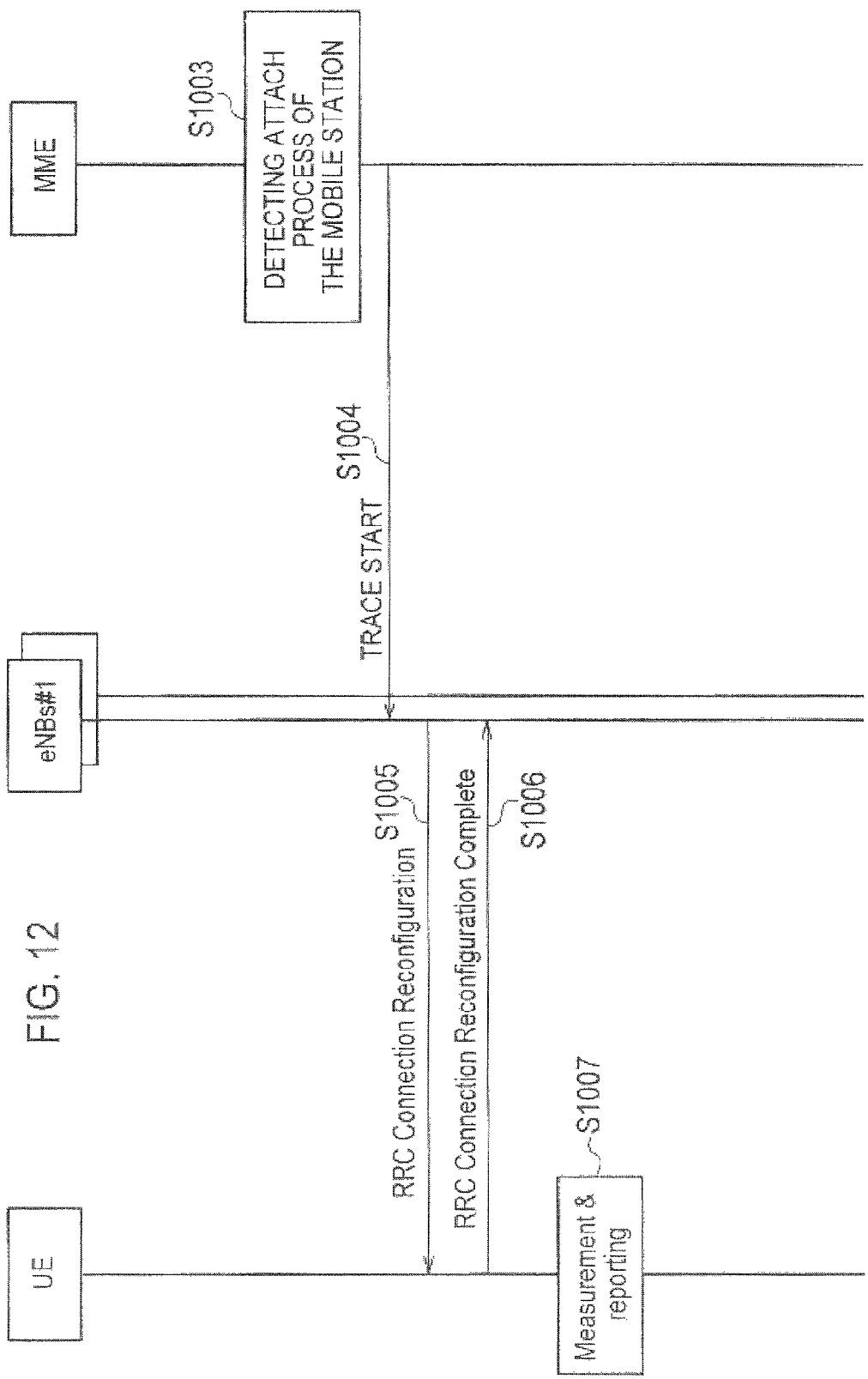
FIG. 12 is a sequence diagram in accordance with one or more embodiments of the present invention.

The process in the step S1003 is not limited to the case in which processes (the processes in the step S1001 and step S1002) regarding the handover were performed. For example, the process in the step S1003 may be performed when an Attach process, in which the mobile station UE connects to a network, was performed as shown in FIG. 12, or when the mobile station UE is changed from an "RRC_IDLE state" to an "RRC_CONNECTED state".

In such a case, on the basis of the E-CGI or TAI of the cell #1 included in "Initial UE Message" transmitted from the radio base station eNB#1, the mobile management node MME detects that the Attach process of the mobile station UE was performed in the cell #1 that lies inside the measurement-target area, or the mobile station UE is changed to the "RRC_CONNECTED state" that lies inside the cell #1 in the measurement-target area.

The radio base station eNB#1 transmits "RRC Connection Reconfiguration" including the "Measurement Configuration #1" to the mobile station UE in step S1005, and the mobile station UE transmits "RRC Connection Reconfiguration Complete" to the radio base station eNB#1 in step S1006.

In step S1007, the mobile station UE measures and reports the desired radio quality on the basis of the "Measurement Configuration #1".

In step S1101, the radio base station eNB#1 transmits "PATH SWITCH REQUEST" or "HO NOTIFY" to the mobile management node MME when performing a handover process to the cell #2 of the mobile station UE.

When the "PATH SWITCH REQUEST" is received, the mobile management node MME transmits "PATH SWITCH ACKNOWLEDGEMENT" to the radio base station eNB#1 in step S1102, detects that the mobile station UE moved into the cell #2 on the basis of E-CGI or TAI of the cell #2 included in the "PATH SWITCH REQUEST" in step S1103, and transmits the "DEACTIVATE TRACE" including the "Measurement Configuration #2" for instructing to stop measuring and reporting the desired radio quality to the radio base station eNB#1 in step S1104.

Meanwhile, when the "HO NOTIFY" is received, the mobile management node MME detects that the mobile station UE moved into the cell #2 that lies outside the measurement-target area on the basis of the E-CGI or TAI of the cell #2 included in the "PATH SWITCH REQUEST" in the step S1103, and transmits the "DEACTIVATE TRACE" including the "Measurement Configuration #2" for instructing to stop measuring and reporting the desired radio quality to the radio base station eNB#1 in the step S1104.

The radio base station eNB#1 transmits "RRC Connection Reconfiguration" including the "Measurement Configuration #2" to the mobile station UE in step S1105, and the mobile station UE transmits "RRC Connection Reconfiguration Complete" to the radio base station eNB#1 in step S1106.

Then, the mobile station UE stops measuring and reporting the desired radio quality on the basis of the "Measurement Configuration #2".

In accordance with the mobile communication system according to the present embodiment, it is possible to cause a specific mobile station UE to measure and report a desired radio quality when the specific mobile station UE moved into a cell that lies inside a specific area.

(Mobile Communication System According to Second Embodiment of the Present Invention)

With reference to FIG. 5 to FIG. 11, a mobile communication system according to a second embodiment of the present invention will be described while focusing on the difference from the mobile communication system according to the above-mentioned first embodiment.

Figure 5:
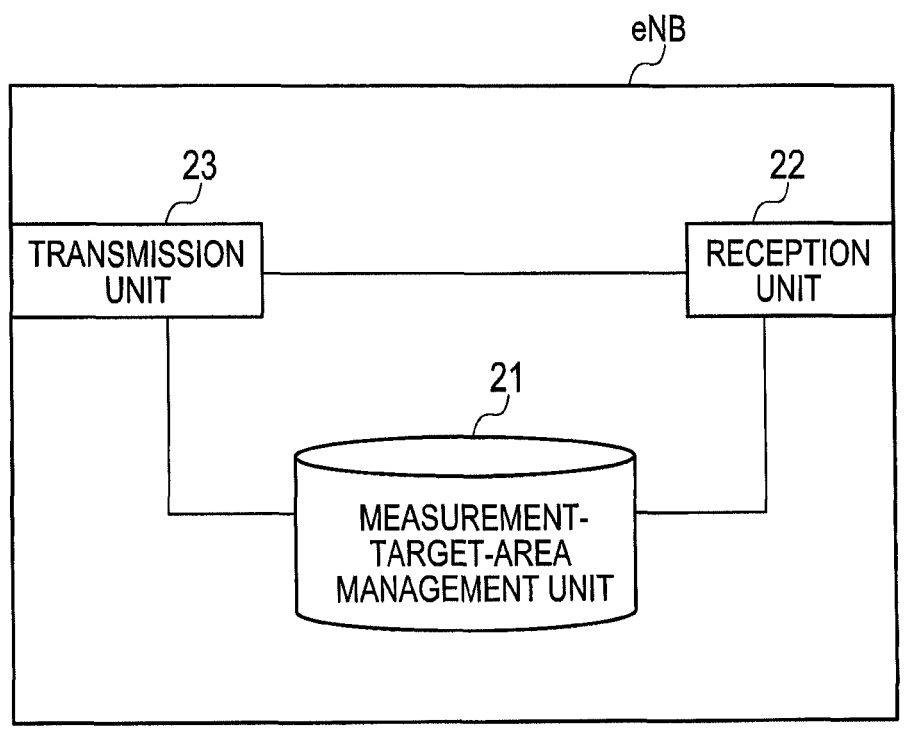
FIG. 5 is a function block diagram of a radio base station according to a second embodiment of the present invention.

As illustrated in FIG. 5, the radio base station eNB includes a measurement-target-area management unit 21, a reception unit 22, and a transmission unit 23.

The reception unit 22 is configured to receive a signal transmitted by the mobile management node MME, the mobile station UE, or another radio base station eNB.

For example, the reception unit 22 is configured to receive information for designating a measurement-target area, a desired radio quality to be measured as MDT, a method of reporting a measurement result in the MDT, and the like from the mobile management node MME.

The measurement-target-area management unit 21 is configured to manage the information for designating the measurement-target area, the desired radio quality to be measured as the MDT, the method of reporting the measurement result in the MDT, and the like, which were acquired from the mobile management node MME.

In addition, when the measurement-target area is designated by latitude/longitude information as illustrated in FIG. 3(a) and FIG. 3(b), the measurement-target-area management unit 21 may be configured to manage a list of cells or TA (Tracking Area), which include the measurement-target area designated by the latitude/longitude information, as the information for designating the measurement-target area.

The transmission unit 23 is configured to transmit a signal to the mobile management node MME, the mobile station UE, or another radio base station eNB.

For example, the transmission unit 23 is configured to transmit "RRC Connection Reconfiguration" including "Measurement Configuration" to the mobile station UE.

Hereinafter, with reference to FIG. 6 and FIG. 7, the operation of the mobile communication system according to the present embodiment will be described.

Figure 6:
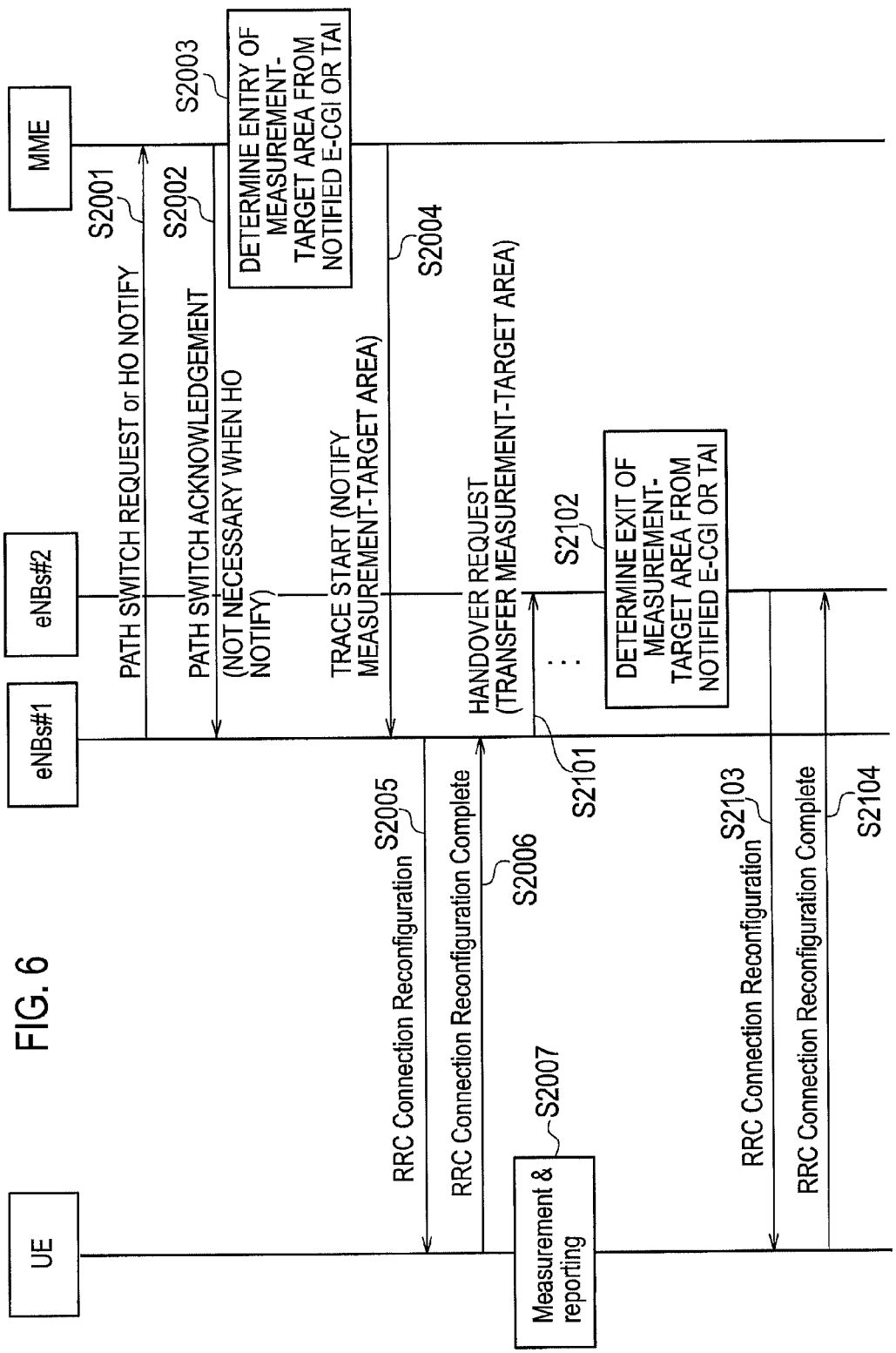
FIG. 6 is a sequence diagram illustrating operations in a mobile communication system according to the second embodiment of the present invention.
Figure 11:
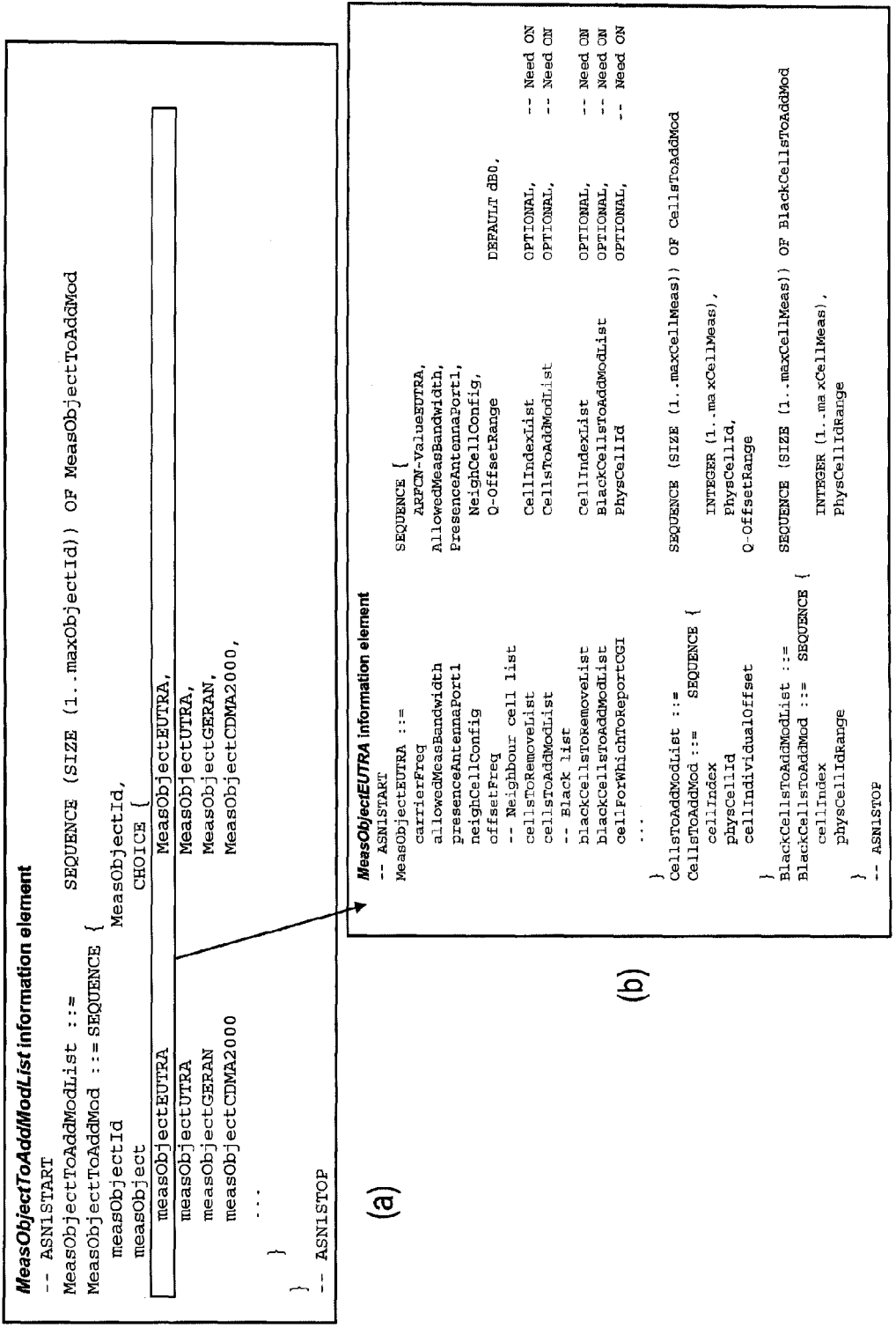
FIG. 11($a$) and FIG. 11($b$) are diagrams illustrating an example of a format of information elements "MeasObjectToAddModList" and "MeasObjectEUTRA" in the information element "MeasConfig" in the information element "AS-Config" in the "Handover Preparation Information" used in the mobile communication system according to the second embodiment of the present invention.

As illustrated in FIG. 6, in step S2001, the radio base station eNB#1 transmits "PATH SWITCH REQUEST" or "HO NOTIFY" to the mobile management node MME when performing a handover process to the cell #1 of the mobile station UE.

When the "PATH SWITCH REQUEST" is received, the mobile management node MME transmits "PATH SWITCH ACKNOWLEDGEMENT" to the radio base station eNB#1 in step S2002, detects that the mobile station UE moved into the cell #1 that lies inside the measurement-target area on the basis of E-CGI or TAI of the cell #1 included in the "PATH SWITCH REQUEST" in step S2003, and transmits the "TRACE START" including the "Measurement Configuration #1" for instructing to measure and report the desired radio quality to the radio base station eNB#1 in step S2004.

Meanwhile, when the "HO NOTIFY" is received, the mobile management node MME detects that the mobile station UE moved into the cell #1 that lies inside the measurement-target area on the basis of the E-CGI or TAI of the cell #1 included in the "PATH SWITCH REQUEST" in the step S2003, and transmits the "TRACE START" including the "Measurement Configuration #1" for instructing to measure and report the desired radio quality to the radio base station eNB#1 in the step S2004.

The process in the step S2003 is not limited to the case in which processes (the processes of the step S2001 and the step S2002) regarding the handover were performed. For example, the process in the step S2003 may be performed when an Attach process, in which the mobile station UE connects to a network, was performed, or when the mobile station UE is changed from an "RRC_IDLE state" to an "RRC_CONNECTED state".

In such a case, on the basis of the E-CGI or TAI of the cell #1 included in "Initial UE Message" transmitted from the radio base station eNB#1, the mobile management node MME detects that the Attach process of the mobile station UE was performed in the cell #1 that lies inside the measurement-target area, or the mobile station UE is changed to the "RRC_CONNECTED state" that lies inside the cell #1 in the measurement-target area.

The radio base station eNB#1 transmits "RRC Connection Reconfiguration" including the "Measurement Configuration #1" to the mobile station UE in step S2005, and the mobile station UE transmits "RRC Connection Reconfiguration Complete" to the radio base station eNB#1 in step S2006.

In step S2007, the mobile station UE measures and reports the desired radio quality on the basis of the "Measurement Configuration #1".

In step S2101, the radio base station eNB#1 transmits "HANDOVER REQUEST" to the radio base station eNB#2 when performing a handover process to the cell #2 of the mobile station UE.

Furthermore, for example, as illustrated in FIG. 7, the radio base station eNB#1 transmits information (for example, a list of TAI, a list of E-CGI, and an area designated by latitude/longitude information) for designating the measurement-target area, which was acquired from the mobile management node MME, through an information element "TRACE ACTIVATION" in the "HANDOVER REQUEST".

In step S2102, the radio base station eNB#2 detects that the mobile station UE moved into the cell #2 that lies outside the measurement-target area, on the basis of the E-CGI, the TAI and the like included in the "TRACE ACTIVATION".

In step S2103, the radio base station eNB#2 transmits "RRC Connection Reconfiguration" including "Measurement Configuration #2" to the mobile station UE, and the mobile station UE transmits "RRC Connection Reconfiguration Complete" to the radio base station eNB#2 in step S2104.

Then, the mobile station UE stops measuring and reporting the desired radio quality on the basis of the "Measurement Configuration #2".

In addition, as illustrated in FIG. 8 to FIG. 11, the radio base station eNB#1 may transmit the information (for example, a list of TAI, a list of E-CGI, and an area designated by latitude/longitude information) for designating the measurement-target area, which was acquired from the mobile management node MME, through an information element "MeasObjectEUTRA" in an information element "MeasObjectToAddModList" in an information element "MeasConfig" in an information element "AS-Config" in an information element "Handover Preparation Information" in the "HANDOVER REQUEST".

The characteristics of the present embodiment as described above may be expressed as follows.

A first characteristic of the present embodiment is summarized in that a mobile communication method includes: a step of transmitting, by a mobile management node MME, "Measurement Configuration #1 (first instruction information)" for instructing to measure and report a desired radio quality to a radio base station eNB#1 (a first radio base station) that manages a cell #1 (a first cell) when it is detected that a mobile station UE has moved into the cell #1 that lies inside a measurement-target area; and a step of transmitting, by the radio base station eNB#1, "RRC Connection Reconfiguration" including the "Measurement Configuration #1" to the mobile station UE.

In the first characteristic of the present embodiment, the mobile communication method may further include: a step of transmitting, by the mobile management node MME, "Measurement Configuration #2 (second instruction information)" for instructing to stop measuring and reporting the desired radio quality to a radio base station eNB#2 (a second radio base station) that manages a cell #2 (a second cell) when it is detected that the mobile station UE has moved into the cell #2 that lies outside the measurement-target area; and a step of transmitting, by the radio base station eNB#2, the "Measurement Configuration #2" to the mobile station UE.

In the first characteristic of the present embodiment, the mobile communication method may further include: a step of transmitting, by the mobile management node MME, information for designating the measurement-target area to the radio base station eNB#1; a step of transmitting, by the radio base station eNB#1, the information for designating the measurement-target area to the radio base station eNB#2 that manages the cell #2; and a step of transmitting, by the radio base station eNB#2, the "Measurement Configuration #2" for instructing to stop measuring and reporting the desired radio quality to the mobile station UE when it is detected that the mobile station UE has moved into the cell #2 on the basis of the information for designating the measurement-target area.

In the first characteristic of the present embodiment, the radio base station eNB#1 may transmit the information for designating the measurement-target area to the radio base station eNB#2 through "HANDOVER REQUEST (a handover request signal)".

In the first characteristic of the present embodiment, the mobile management node MME may detect that the mobile station UE moved into the cell #1 in response to "PATH SWITCH REQUEST (a path switching request signal)" or "HO NOTIFY (a handover notification signal)" received from the radio base station eNB#1.

A second characteristic of the present embodiment is summarized in that a mobile communication method includes: a step of transmitting, by a mobile management node MME, "Measurement Configuration #1" to a radio base station eNB#1 that manages a cell #1 when it is detected that a mobile station UE has performed an Attach process in the cell #1 that lies inside a measurement-target area; and a step of transmitting, by the radio base station eNB#1, the "Measurement Configuration #1" to the mobile station UE.

A third characteristic of the present embodiment is summarized in that a mobile communication method includes: a step of transmitting, by a mobile management node MME, "Measurement Configuration #1" to a radio base station eNB#1 that manages a cell #1 when it is detected that a mobile station UE has changed to an "RRC_CONNECTED state" in the cell #1 that lies inside a measurement-target area; and a step of transmitting, by the radio base station eNB#1, "Measurement Configuration #1" to the mobile station UE.

Note that the operation of the O&M server, the mobile management node MME, the radio base station eNB, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the O&M server, the mobile management node MME, the radio base station eNB, or the mobile station UE. Furthermore, such a storage medium and processor may be arranged in the O&M server, the mobile management node MME, the radio base station eNB, or the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
MME . . . Mobile management node
11 . . . Measurement-target-area management unit
12 . . . Instruction unit
eNB . . . Radio base station
21 . . . Measurement-target-area management unit
22 . . . reception unit
23 . . . Transmission unit

The invention claimed is:

1. A mobile communication method comprising:
 a step of transmitting, by a mobile management node, first instruction information for Minimization of Drive Tests (MDT) measurement to a first radio base station when the mobile management node detects that a mobile station has requested an Attach process in a first cell which the first radio base station manages, wherein the first instruction information for MDT measurement instructs the mobile station to measure and report a desired radio quality in a measurement target area for MDT measurement; and
 a step of transmitting, by the first radio base station, the first instruction information for MDT measurement to the mobile station soon after the mobile station requests the Attach process, but before completing RRC Connection Reconfiguration between the first radio base station and the mobile station.

2. The mobile communication method according to claim 1, wherein
 the mobile management node designates the first radio base station, which manages the first cell where the mobile station requests the Attach process from among the plurality of radio base stations which the mobile management node manages, and
 the mobile management node transmits the first instruction information for MDT measurement to the designated first radio base station.

3. A mobile management node configured to transmit first instruction information for Minimization of Drive Tests (MDT) measurement to a first radio base station when the mobile management node detects that a mobile station has requested an Attach process in a first cell which the first radio base station manages, wherein the first instruction information for MDT measurement instructs the mobile station to measure and report a desired radio quality in a measurement target area for MDT measurement, and the first radio base station transmits the first instruction information for MDT measurement to the mobile station soon after the mobile station requests the Attach process, but before completing RRC Connection Reconfiguration between the first radio base station and the mobile station.

4. The mobile management node according to claim 3, wherein
- the mobile management node designates the first radio base station, which manages the first cell where the mobile station requests the Attach process from among the plurality of radio base stations which the mobile management node manages, and
- the mobile management node transmits the first instruction information for MDT measurement to the designated first radio base station.

* * * * *